(12) United States Patent
Walker et al.

(10) Patent No.: US 11,999,902 B1
(45) Date of Patent: Jun. 4, 2024

(54) CHEMICAL ENHANCED HYDROCARBON RECOVERY

(71) Applicant: Pioneer Natural Resources USA, Inc., Irving, TX (US)

(72) Inventors: Dustin L. Walker, Irving, TX (US); Joshua W. Brownlow, Irving, TX (US); Kyle D. Scott, Irving, TX (US)

(73) Assignee: Pioneer Natural Resources USA, Inc., Irving, TX (US)

( * ) Notice: Subject to any disclaimer, the term of this patent is extended or adjusted under 35 U.S.C. 154(b) by 0 days.

(21) Appl. No.: 18/428,077

(22) Filed: Jan. 31, 2024

Related U.S. Application Data

(63) Continuation of application No. 17/823,271, filed on Aug. 30, 2022, now Pat. No. 11,920,084.

(60) Provisional application No. 63/260,781, filed on Aug. 31, 2021.

(51) Int. Cl.
*C09K 8/584* (2006.01)
*E21B 43/20* (2006.01)

(52) U.S. Cl.
CPC .............. *C09K 8/584* (2013.01); *E21B 43/20* (2013.01)

(58) Field of Classification Search
CPC ..................................................... C09K 8/584
See application file for complete search history.

(56) References Cited

U.S. PATENT DOCUMENTS

| | | | |
|---|---|---|---|
| 4,743,385 A | 5/1988 | Angstadt et al. | |
| 5,026,491 A | 6/1991 | Haack et al. | |
| 7,985,718 B2 * | 7/2011 | Steinbrenner | C09K 8/584 |
| | | | 507/252 |
| 8,276,663 B2 | 10/2012 | Holtsclaw et al. | |
| 8,828,914 B2 | 9/2014 | Kesavan et al. | |
| 9,840,657 B2 | 12/2017 | Southwick et al. | |
| 10,094,207 B2 | 10/2018 | Southwick | |
| 10,435,618 B2 | 10/2019 | Ravikiran et al. | |
| 10,851,629 B2 | 12/2020 | Dwarakanath et al. | |
| 11,066,910 B2 | 7/2021 | Ayirala et al. | |
| 11,920,084 B1 | 3/2024 | Walker et al. | |
| 2009/0105411 A1 | 4/2009 | Erdem et al. | |
| 2009/0203557 A1 | 8/2009 | Barnes et al. | |
| 2012/0073821 A1 | 3/2012 | Holtsclaw et al. | |
| 2014/0024560 A1 | 1/2014 | Gonzalez Poche et al. | |
| 2015/0075790 A1 | 3/2015 | Loiseau et al. | |
| 2015/0141303 A1 | 5/2015 | Harwell et al. | |
| 2017/0114270 A1 | 4/2017 | Ravikiran et al. | |
| 2018/0265767 A1 | 9/2018 | Barnes et al. | |
| 2020/0317992 A1 | 10/2020 | Walker et al. | |
| 2020/0317993 A1 | 10/2020 | Walker et al. | |
| 2021/0095184 A1 | 4/2021 | Walker et al. | |

FOREIGN PATENT DOCUMENTS

EP 2261298 A1 12/2010
WO 2020112077 A1 6/2020

* cited by examiner

*Primary Examiner* — Angela M Ditrani Leff
*Assistant Examiner* — Avi T Skaist
(74) *Attorney, Agent, or Firm* — Scheef & Stone, LLP; Keith C. Rawlins

(57) ABSTRACT

Compositions and methods for chemical enhanced hydrocarbon recovery that utilize a nonionic surfactant that is a mixture of isomerized $C_{9-11}$ ethoxylated alcohols.

17 Claims, 1 Drawing Sheet

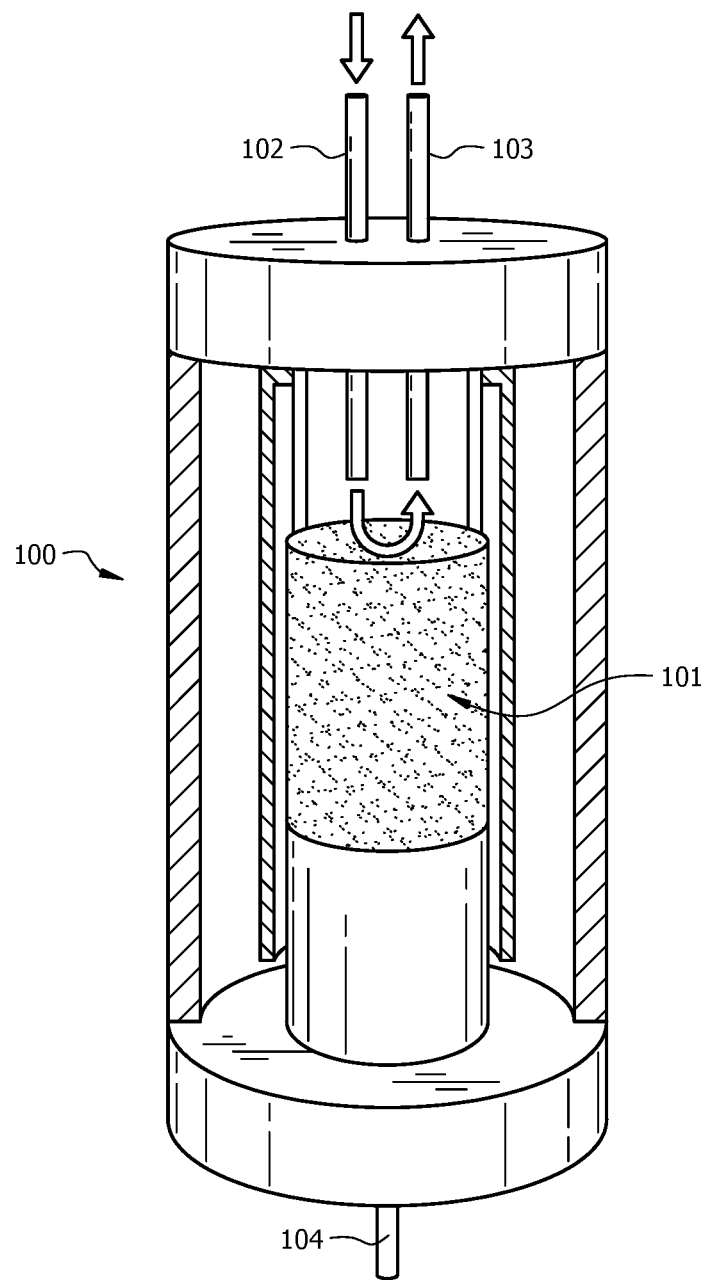

CHEMICAL ENHANCED HYDROCARBON RECOVERY

CROSS-REFERENCE TO RELATED APPLICATIONS

The present Application is a continuation of U.S. patent application Ser. No. 17/823,271, entitled Chemical Enhanced Hydrocarbon Recovery, filed Aug. 30, 2022, which claims the benefit of, and priority to, U.S. Provisional Application No. 63/260,781, entitled Chemical Enhanced Hydrocarbon Recovery, filed on Aug. 31, 2021, both of which are incorporated by reference in their entirety.

FIELD OF THE DISCLOSURE

This disclosure relates to the production of hydrocarbons from a subterranean formation, and more particularly, to chemical enhanced hydrocarbon recovery.

BACKGROUND

Wellbores can be formed in a subterranean formation for the purpose of recovering hydrocarbons (e.g., oil, gas, or both oil and gas) from the subterranean formation via the wellbore. During primary recovery of the hydrocarbons, the rate of production gradually decreases to point at which hydrocarbon extraction is discontinued or a secondary recovery technique is implemented in order to revive the rate of hydrocarbon production from the subterranean formation. Examples of secondary recovery include water or gas injection into another wellbore(s) formed in the subterranean formation, in an effort to push hydrocarbons through the subterranean formation and into the production wellbore(s) via a pressure differential.

Wells in unconventional subterranean formations can be fractured for primary or secondary recovery by injecting a fracturing fluid at a high pressure into the wellbore. The high-pressure injection creates fractures in the subterranean formation that provide fluid flow pathways for hydrocarbons that would otherwise be trapped in the unconventional subterranean formation. One problem associated with fracking is that the fracking fluid can be unstable when exposed to reservoir conditions, and as such, can cause a loss in well productivity through formation damage due to plugging of porous portions of the subterranean formation.

After treatment by a secondary recovery technique and/or fracking, hydrocarbon production can be revived, and production can continue. The production rate can gradually decrease to an unsustainable level, whether due to natural decline or due to formation damage during previous stages of recovery.

Chemical enhanced hydrocarbon recovery can be implemented to enhance hydrocarbon production. For example, compositions and methods have been suggested to address formation damage due to fracking in U.S. Patent Application Publication Nos. 2020/0317992A1, 2020/0317993A1, and 2021/0095184A1.

There is ongoing need for enhanced hydrocarbon recovery solutions and advancements.

SUMMARY

A chemical enhanced hydrocarbon recovery method comprising: introducing an enhanced hydrocarbon recovery composition comprising a surfactant component and a water component into a subterranean formation via a wellbore. The surfactant component can include a mixture of isomerized $C_{9-11}$ ethoxylated alcohols. The mixture of isomerized $C_{9-11}$ ethoxylated alcohols can include a $C_9$ ethoxylated alcohol, a $C_{10}$ ethoxylated alcohol, a $C_{11}$ ethoxylated alcohol, and one or more isomers of at least one of the $C_9$ ethoxylated alcohol, the $C_{10}$ ethoxylated alcohol, and the $C_{11}$ ethoxylated alcohol.

A chemical enhanced hydrocarbon recovery method comprising: introducing an enhanced hydrocarbon recovery composition into a subterranean formation via a wellbore; and producing a hydrocarbon composition from the subterranean formation that is different than a hydrocarbon composition produced from the subterranean formation prior to the introducing step. The enhanced hydrocarbon recovery composition can be of any embodiment disclosed herein.

A chemical enhanced hydrocarbon recovery composition comprising or consisting of a surfactant component and a water component. The surfactant component can include a mixture of isomerized $C_{9-11}$ ethoxylated alcohols. The surfactant component can additionally include one or more anionic surfactants. The composition can additionally comprise or consist of one or more of a biocide component, an alkali component, a cosolvent component, a hydrotrope component, and viscosifying component.

A chemical enhanced hydrocarbon recovery composition comprising a surfactant component and a water component. The surfactant component can include a mixture of isomerized C10-rich $C_{9-11}$ ethoxylated alcohols. The surfactant component can additionally include one or more anionic surfactants. The composition can additionally include one or more of a biocide component, an alkali component, a cosolvent component, a hydrotrope component, and a viscosifying component.

A chemical enhanced hydrocarbon recovery composition consisting of a surfactant component and a water component. The surfactant component can include a mixture of isomerized $C_{9-11}$ ethoxylated alcohols. The surfactant component can additionally include one or more anionic surfactants.

A chemical enhanced hydrocarbon recovery composition consisting of a surfactant component and a water component. The surfactant component can include a mixture of isomerized C10-rich $C_{9-11}$ ethoxylated alcohols. The surfactant component can additionally include one or more anionic surfactants.

A chemical enhanced hydrocarbon recovery composition consisting of a surfactant component, a water component, and one or more of one or more of: a biocide component, an alkali component, a cosolvent component, a hydrotrope component, and a viscosifying component. The surfactant component can include a mixture of isomerized $C_{9-11}$ ethoxylated alcohols. The surfactant component can additionally include one or more anionic surfactants.

A chemical enhanced hydrocarbon recovery composition consisting of a surfactant component, a water component, and one or more of one or more of: a biocide component, an alkali component, a cosolvent component, a hydrotrope component, and a viscosifying component. The surfactant component can include a mixture of isomerized C10-rich $C_{9-11}$ ethoxylated alcohols. The surfactant component can additionally include one or more anionic surfactants.

A surfactant component for an enhanced hydrocarbon recovery composition, the surfactant component comprising or consisting of a mixture of isomerized $C_{9-11}$ ethoxylated alcohols.

A surfactant component for an enhanced hydrocarbon recovery composition, the surfactant component comprising or consisting of a mixture of isomerized C10-rich $C_{9-11}$ ethoxylated alcohols.

A surfactant component for an enhanced hydrocarbon recovery composition, the surfactant component comprising or consisting of a mixture of isomerized $C_{9-11}$ ethoxylated alcohols and one or more anionic surfactants.

A surfactant component for an enhanced hydrocarbon recovery composition, the surfactant component comprising or consisting of a mixture of isomerized C10-rich $C_{9-11}$ ethoxylated alcohols and optionally one or more anionic surfactants.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The FIGURE illustrates a side perspective view of an apparatus in which enhanced hydrocarbon recovery compositions were tested, with a portion of the apparatus cut away to view the core sample inside the apparatus.

DETAILED DESCRIPTION

It should be understood at the outset that although an illustrative implementation of one or more embodiments are provided below, the disclosed composition and method may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The terms "comprise," "include," and "having" (as well as forms, derivatives, or variations thereof) as used herein are inclusive and open-ended, and do not exclude additional elements or features. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited.

The use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The term "about" as used herein applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of +10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, and groups of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., $C_1$ and $C_2$). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

The terms "subterranean formation" or "formation" as used herein refers to the rock matrix in which a wellbore may be drilled for the purpose of extracting hydrocarbons therefrom. A subterranean formation can include faults, fractures (e.g., naturally occurring fractures, fractures created through hydraulic fracturing), overburdens, underburdens, horizons, salt domes, salt welds, or combinations thereof. The subterranean formation can be located onshore or offshore. Furthermore, the subterranean formation can include hydrocarbons, such as liquid hydrocarbons (also known as oil or petroleum), gas hydrocarbons, or a combination of liquid hydrocarbons and gas hydrocarbons (e.g., including gas condensate). The subterranean formation can additionally include non-hydrocarbon items, naturally occurring reservoirs of water or brine, connate water, fluids from secondary or enhanced oil recovery, or combinations thereof.

The term "unconventional formation" is a type of subterranean formation that requires intervention in order to recover hydrocarbons from the reservoir at economical flow rates or volumes. For example, a subterranean formation can have at least a portion thereof that is an unconventional formation characterized by an unconventional microstructure, such as having submicron pore size (a rock matrix with an average pore size less than 1 micrometer), in which fractures in the unconventional portion of the subterranean formation are utilized to recover hydrocarbons at economical flow rates or volumes (e.g., via naturally occurring fractures and/or artificial fractures created by fracking).

The terms "wellbore" or "borehole" or "well" as used herein are synonymous with one another and refer to a continuous hole formed (e.g., drilled) in a subterranean formation for the purpose of hydrocarbon recovery. For example, a wellbore may be a cylindrical hole drilled into the formation such that the wellbore is surrounded by the formation, including rocks, sands, sediments, and fluids. A wellbore may be used for injection, production, hydraulic fracturing of the subterranean formation, or a combination thereof (e.g., sequential use for fracturing, then production; sequential use for production, then injection). The wellbore may have vertical, inclined, horizontal, or a combination of trajectories. For example, the wellbore may be a vertical wellbore, a horizontal wellbore, a multilateral wellbore, or slanted wellbore. The wellbore may include a plurality of components, such as, but not limited to, a casing, a liner, a tubing string, a heating element, a sensor, a packer, a screen, a gravel pack, or combinations thereof. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift.

The terms "unconventional wellbore," "unconventional borehole," or "unconventional well" as used herein refer to a "wellbore" or "borehole" or "well" that has at least a portion that is non-vertically oriented, for example, horizontally oriented or +/−89° with respective to horizontal.

Disclosed are compositions and methods that remediate artificial and natural fractures in an unconventional or "tight" formation oil and gas well, reversing formation damage induced during normal production operations and increasing recoverable hydrocarbon.

Compositions

The enhanced hydrocarbon recovery composition can generally include a surfactant component and a water component. The enhanced hydrocarbon recovery composition can optionally include one or more components selected from a biocide component, an alkali component, a cosolvent component, a hydrotrope component, a biocide component, and a viscosifying component.

One or more surfactants disclosed herein that embody the surfactant component can improve hydrocarbon recovery by changing the interfacial tension (IFT) of the molecules in the composition when in the subterranean formation and by changing the wettability of the portions of the subterranean formation that are contacted by the composition. For example, IFT can be decreased, and wettability can be increased.

The surfactant component can include a nonionic surfactant, an anionic surfactant, a combination of nonionic surfactants, a combination of anionic surfactants, a combination of an anionic surfactant with a nonionic surfactant, a combination of multiple nonionic surfactants with an anionic surfactant, a combination of a nonionic surfactant with multiple anionic surfactants, or a combination of multiple nonionic surfactants with multiple anionic surfactants. In embodiments, the surfactant component can consist of one or a combination of nonionic surfactants disclosed herein; alternatively, the surfactant component can consist of a one or a combination of nonionic surfactants and one or more anionic surfactants disclosed herein.

The surfactant component can be present in the enhanced hydrocarbon recovery composition in an amount in the range of at least about 0.1, 0.2, 0.3, 0.4, 0.5, 0.6, 0.7, 0.8, 0.9, or 0.1 wt % and less than about 0.5, 0.6, 0.7, 0.8, 0.9, or 1.0 wt % based on a total weight of the enhanced hydrocarbon recovery composition. The amount of the surfactant component can be present in the enhanced hydrocarbon recovery composition in an amount ranging from any of the minimum values described above to any of the maximum values described above.

Suitable nonionic surfactants for use in the surfactant component of the enhanced hydrocarbon recovery composition include compounds that can be added to change wettability in the subterranean formation.

Examples nonionic surfactants include alkyl aryl alkoxy alcohols, alkyl alkoxy alcohols, or any combination thereof. In embodiments, the nonionic surfactant may be a mix of surfactants with different length lipophilic tail chain lengths.

In embodiments, the nonionic surfactant contains $C_9$-$C_1$ ethoxylated alcohols, a nomenclature used herein which designates, for these embodiments, that the $C_9$-$C_{11}$ ethoxylated alcohols contain a mixture of $C_9$ ethoxylated alcohol, $C_{10}$ ethoxylated alcohol, and $C_{11}$ ethoxylated alcohol.

In embodiments, the $C_9$-$C_{11}$ groups of the ethoxylated alcohols are lipophilic tails, e.g., the mixture has ethoxylated alcohols having a lipophilic tail length of 9 carbons, a lipophilic tail length of 10 carbons, and a lipophilic tail length of 11 carbons. In embodiments, the $C_9$-$C_{11}$ tails are substantially branched. "Substantially branched" as used herein for the $C_9$-$C_{11}$ tails means that greater than 95, 96, 97, 98, 99.0, 99.1, 99.2, 99.3, 99.4, 99.5, 99.6, 99.7, 99.8, or 99.9 wt % of the mixture of $C_9$-$C_{11}$ ethoxylated alcohols contains branched $C_9$-$C_{11}$ tails.

In embodiments, the $C_9$-$C_{11}$ ethoxylated alcohols may be written as $C_9$-$C_{11}$:nEO, which indicates a mixture of $C_9$ ethoxylated alcohol, $C_{10}$ ethoxylated alcohol, and $C_1$ ethoxylated alcohol, where each is followed by a chain of "n" ethoxy (EO) units, where "n" is indicative of the average distribution of EO units in the molecule. That is, within the scope of this disclosure "nEO" refers to the average number of EO units in a distribution of EO units in the mixture of $C_9$-$C_{11}$ ethoxylated alcohols. In embodiments, "n" can be in a range of from 1 to 100 repeating units of EO; alternatively, "n" can be in a range of from 1 to 50 repeating units of EO; alternatively, "n" can be in a range of from 1 to 20 repeating units of EO alternatively, "n" can be in a range of from 1 to 10 repeating units of EO; alternatively, "n" can be 8 repeating units of EO. Alternatively nomenclature for disclosing $C_9$-$C_{11}$ ethoxylated alcohols may be $C_9$:8EO, $C_{10}$:8EO, and $C_{11}$:8EO, which indicates a mixture of nonionic surfactants that have i) a lipophilic tail length of 9 carbons, ii) a lipophilic tail length of 10 carbons, iii) a lipophilic tail length of 11 carbons, and iv) a distribution of various numbers of EO units among the carbon tails that average 8 EO units.

In embodiments, the distribution of "n" EO units can include greater than about 50, 55, 60, or 65 wt % and less than 100, 95, 90, 95, 80, 75, or 70 wt % of the molecules in the mixture having "n" EO units, with the remaining balance of molecules having a normal distribution of EO units that is less than and greater than n.

In additional embodiments, the $C_9$-$C_{11}$ ethoxylated alcohols are isomerized. "Isomerized" as used in this context means that isomers of at least one of the $C_9$ ethoxylated alcohol, $C_{10}$ ethoxylated alcohol, and $C_{11}$ ethoxylated alcohol are present in the mixture. Isomers can include: a structural isomer, a stereoisomer, or both a structural isomer and a stereoisomer of the $C_9$ ethoxylated alcohol; a structural isomer, a stereoisomer, or both a structural isomer and a stereoisomer of the $C_{10}$ ethoxylated alcohol; a structural isomer, a stereoisomer, or both a structural isomer and a stereoisomer of the $C_{11}$ ethoxylated alcohol; structural isomers, stereoisomers, or both structural isomers and stereoisomers of the $C_9$ ethoxylated alcohol and the $C_{10}$ ethoxylated alcohol; structural isomers, stereoisomers, or both structural isomers and stereoisomers of the $C_9$ ethoxylated alcohol and the $C_{11}$ ethoxylated alcohol; structural isomers, stereoisomers, or both structural isomers and stereoisomers of the $C_{10}$ ethoxylated alcohol and the $C_{10}$ ethoxylated alcohol; or structural isomers, stereoisomers, or both structural isomers and stereoisomers of the $C_9$ ethoxylated alcohol, the $C_{10}$ ethoxylated alcohol, and the $C_{11}$ ethoxylated alcohol.

In embodiments, an amount of isomers in the isomerized $C_9$-$C_{11}$ ethoxylated alcohols can be at least about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 wt % to equal to or less than about 100, 99, 98, 97, 96, 95, 94, 93, 92, 91, or 90 wt % based on a total weight of the $C_9$-$C_{11}$ ethoxylated alcohols in the surfactant component. In an embodiment, the $C_9$-$C_{11}$ ethoxylated alcohols contains only isomers (a pure isomeric composition) of the $C_9$ ethoxylated alcohol and the $C_{10}$ ethoxylated alcohol and the $C_{11}$ ethoxylated alcohol. The amount of isomers in the $C_9$-$C_{11}$ ethoxylated alcohols can be present in an amount ranging from any of the minimum values described above to any of the maximum values described above.

In further embodiments, the $C_9$-$C_{11}$ ethoxylated alcohols are C10-rich. By "C10-rich", it is meant that the $C_{10}$ ethoxylated alcohol (and any isomers of the $C_{10}$ ethoxylated alcohol) is present in the $C_9$-$C_{11}$ ethoxylated alcohols in an amount of greater than the normal amount of $C_{10}$ ethoxylated alcohol present in a normal mixture of $C_9$-$C_{11}$ ethoxylated alcohols and less than 100, 90, 80, 70, or 60 wt % based on a total weight of the $C_9$-$C_1$ ethoxylated alcohols in the surfactant component; alternatively, in an amount of greater than 50 wt % and less than 100, 90, 80, 70, or 60 wt % based on a total weight of the $C_9$-$C_{11}$ ethoxylated alcohols in the surfactant component.

The $C_9$-$C_{11}$ ethoxylated alcohols can be present in the surfactant component in an amount of at least about 10, 15, 20, 25, 30, 35, 40, 45, or 50 wt % and equal to or less than about 100, 95, 90, 85, 80, 75, 70, 65, 60, or 55 wt % based on a total weight of the surfactant component. The amount of the $C_9$-$C_{11}$ ethoxylated alcohols can be present in the surfactant component in an amount ranging from any of the minimum values described above to any of the maximum values described above.

The $C_9$-$C_{11}$ ethoxylated alcohols can be present in the enhanced hydrocarbon recovery composition in an amount of at least about 0.10, 0.11, 0.12, 0.13, 0.14, 0.15, 0.16, 0.17, 0.18, 0.19, 0.20 wt % and less than about 0.30, 0.29, 0.28, 0.27, 0.26, or 0.25 wt % based on a total weight of the enhanced hydrocarbon recovery composition. The $C_9$-$C_{11}$ ethoxylated alcohols can be present in the enhanced hydrocarbon recovery composition in an amount of about 0.20, 0.21, 0.22, 0.23, 0.24, or 0.25 wt % based on a total weight of the enhanced hydrocarbon recovery composition. The amount of the $C_9$-$C_{11}$ ethoxylated alcohols can be present in the enhanced hydrocarbon recovery composition in an amount ranging from any of the minimum values described above to any of the maximum values described above.

Within the scope of this disclosure "a mixture of isomerized $C_9$-$C_{11}$ ethoxylated alcohols" has an amount of isomers that is greater than those found in a normal mixture of $C_9$-$C_{11}$ ethoxylated alcohols. In some aspects, the isomerized $C_9$-$C_{11}$ ethoxylated alcohols are obtained by processing a mixture containing $C_9$-$C_{11}$ alcohols and isomers thereof to produce a mixture of $C_9$-$C_{11}$ ethoxylated alcohols and isomers thereof. The amount of isomers present in "a mixture of isomerized $C_9$-$C_{11}$ ethoxylated alcohols" is greater than any normal amount of isomers present in a normal mixture of $C_9$-$C_{11}$ ethoxylated alcohols.

Within the scope of this disclosure "a mixture of isomerized C10-rich $C_9$-$C_{11}$ ethoxylated alcohols" has an amount of isomers and an amount of $C_{10}$ molecules that are greater than those found in a normal mixture of $C_9$-$C_{11}$ ethoxylated alcohols. In some aspects, the isomerized $C_9$-$C_{11}$ ethoxylated alcohols are obtained by processing a mixture containing $C_9$-$C_{11}$ alcohols and isomers thereof to produce a mixture of $C_9$-$C_{11}$ ethoxylated alcohols that is $C_{10}$ rich. The C10-rich mixture of $C_9$-$C_{11}$ alcohols can then ethoxylated to produce the mixture of isomerized C10-rich $C_9$-$C_{11}$ ethoxylated alcohols. The amount of isomers present in "a mixture of isomerized C10-rich $C_9$-$C_{11}$ ethoxylated alcohols" is greater than any normal amount of isomers present in a normal mixture of $C_9$-$C_{11}$ ethoxylated alcohols, and the amount of $C_{10}$ molecules present in "a mixture of isomerized C10-rich $C_9$-$C_{11}$ ethoxylated alcohols" is greater than the normal amount of $C_{10}$ molecules present in a normal mixture of $C_9$-$C_{11}$ ethoxylated alcohols.

Suitable anionic surfactants for use in the surfactant component include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkyl sulfonate surfactant" or "alkyl sulfonate" refers to a compound that includes an alkyl group (e.g., a branched or unbranched $C_6$-$C_{32}$ alkyl group) attached to —$SO_3$— or acid or salt thereof including metal cations such as sodium.

An "internal olefin sulfonate," "isomerized olefin sulfonate," or "IOS" refers to an unsaturated hydrocarbon compound comprising at least one carbon-carbon double bond and at least one $SO_3$— group, or a salt thereof. As used herein, a "$C_{20}$-$C_{28}$ internal olefin sulfonate," "a $C_{20}$-$C_{28}$ isomerized olefin sulfonate," or "$C_{20}$-$C_{28}$ IOS" refers to an IOS, or a mixture of IOSs with an average carbon number of 20 to 28, or of 23 to 25. The $C_{20}$-$C_{28}$ IOS may comprise at least 80% of IOS with carbon numbers of 20 to 28, at least 90% of IOS with carbon numbers of 20 to 28, or at least 99% of IOS with carbon numbers of 20 to 28. As used herein, a "$C_{15}$-$C_{18}$ internal olefin sulfonate," "$C_{20}$-$C_{28}$ isomerized olefin sulfonate," or "$C_{15}$-$C_{18}$ IOS" refers to an IOS or a mixture of IOSs with an average carbon number of 15 to 18, or of 16 to 17. The $C_{15}$-$C_{18}$ IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a $C_6$-$C_{36}$ linear or branched alkyl group. In embodiments, the anionic surfactant can be an alkylbenzene sulfonate or a dibenzene disufonate. In embodiments, the anionic surfactant can be benzenesulfonic acid, decyl(sulfophenoxy)-disodium salt; linear or branched $C_6$-$C_{36}$ alkyl:PO (0-65):EO(0-100) sulfate; or linear or branched $C_6$-$C_{36}$ alkyl:PO(0-65):EO(0-100) carboxylate. In embodiments, the anionic surfactant is an isomerized olefin sulfonate ($C_6$-$C_{30}$), internal olefin sulfonate ($C_6$-$C_{30}$) or internal olefin disulfonate ($C_6$-$C_{30}$). In some embodiments, the anionic surfactant is a Guerbet-PO(0-65)-EO(0-100) sulfate (Guerbet portion can be $C_6$-$C_{36}$). In some embodiments, the anionic surfactant is a Guerbet-PO(0-65)-EO(0-100) carboxylate (Guerbet portion can be $C_6$-$C_{36}$). In some embodiments, the anionic surfactant is alkyl PO(0-65) and EO(0-100) sulfonate: where the alkyl group is linear or branched $C_6$-$C_{36}$. In some embodiments, the anionic surfactant is a sulfosuccinate, such as a dialkylsulfosuccinate. In some embodiments, the anionic surfactant is an alkyl aryl sulfonate (AAS) (e.g., an alkyl benzene sulfonate (ABS)), a $C_{10}$-$C_{30}$ internal olefin sulfate (IOS), a petroleum sulfonate, or an alkyl diphenyl oxide (di)sulfonate.

In embodiments, the anionic surfactant(s) include a hydrophobic tail that 6 or 12 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfonate moieties (e.g., one, two, or three sulfonate moieties).

Suitable anionic surfactants for use in the surfactant component of the enhanced hydrocarbon recovery composition can include a disulfonate, a mono- or di-alkyl diphenyl oxide disulfonate, or a mono- or di-alkyl diphenyl oxide disulfonate salt. The alkyl group of these disulfonate species can be a $C_6$ or $C_{12}$ group, linear or branched.

In embodiments, the anionic surfactant can a sodium dodecyl ($C_{12}$) diphenyl oxide disulfonate; a sodium dodecyl (branched $C_{12}$) diphenyl oxide disulfonate; sodium hexyl ($C_6$) diphenyl oxide disulfonate.

In embodiments, the anionic surfactant(s) can be present in the surfactant component in an amount of at least about 10, 15, 20, 25, 30, 35, 40, or 45 wt % and less than about 80, 75, 70, 65, 60, 55, or 50 wt % based on a total weight of the surfactant component. The amount of the anionic surfactant(s) can be present in the surfactant component in an amount ranging from any of the minimum values described above to any of the maximum values described above.

In embodiments where the surfactant component includes sodium dodecyl ($C_{12}$) diphenyl oxide disulfonate salt (branched or unbranched), the sodium dodecyl ($C_{12}$) diphenyl oxide disulfonate salt (branched or unbranched) can be present in the surfactant component in an amount of at least about 5, 10, 15, or 20 wt % and less than about 50, 45, 40, 35, 30, or 25 wt % based on a total weight of the surfactant component. The amount of the sodium dodecyl ($C_{12}$) diphenyl oxide disulfonate salt can be present in the surfactant component in an amount ranging from any of the minimum values described above to any of the maximum values described above.

In embodiments where the surfactant component includes sodium hexyl ($C_6$) diphenyl oxide disulfonate salt, the sodium hexyl ($C_6$) diphenyl oxide disulfonate salt can be present in the surfactant component in an amount of at least about 5, 10, 15, or 20 wt % and less than about 45, 40, 35, 30, 25, 24, 23, or 22 wt % based on a total weight of the surfactant component. The amount of the sodium hexyl ($C_6$) diphenyl oxide disulfonate salt can be present in the surfactant component in an amount ranging from any of the minimum values described above to any of the maximum values described above.

In embodiments where the surfactant component includes sodium dodecyl ($C_{12}$) diphenyl oxide disulfonate salt (branched or unbranched), the sodium dodecyl ($C_{12}$) diphenyl oxide disulfonate salt (branched or unbranched) can be present in the enhanced hydrocarbon recovery composition in an amount of at least about 0.01, 0.02, 0.03, 0.04, 0.05, 0.06, 0.07, 0.08, 0.09, or 0.10 wt % and equal to or less than about 0.20, 0.19, 0.18, 0.17, 0.16, 0.15, 0.14, 0.13, 0.12, or 0.11 wt % based on a total weight of the enhanced hydrocarbon recovery composition. The sodium dodecyl ($C_{12}$) diphenyl oxide disulfonate salt (branched or unbranched) can be present in the enhanced hydrocarbon recovery composition in an amount of about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, or 0.20 wt % based on a total weight of the enhanced hydrocarbon recovery composition. The amount of the sodium dodecyl ($C_{12}$) diphenyl oxide disulfonate salt can be present in the enhanced hydrocarbon recovery composition in an amount ranging from any of the minimum values described above to any of the maximum values described above.

In embodiments where the surfactant component includes sodium hexyl ($C_6$) diphenyl oxide disulfonate salt, the sodium hexyl ($C_6$) diphenyl oxide disulfonate salt can be present in the enhanced hydrocarbon recovery composition in an amount of at least about 0.01, 0.02, 0.03, 0.04, 0.05, 0.06, 0.07, 0.08, or 0.09 wt % and less than about 0.20, 0.19, 0.18, 0.17, 0.16, 0.15, 0.14, 0.13, 0.12, 0.11, or 0.10 wt % based on a total weight of the enhanced hydrocarbon recovery composition. In embodiments, the sodium hexyl ($C_6$) diphenyl oxide disulfonate salt can be present in the enhanced hydrocarbon recovery composition in an amount of about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, or 0.20 wt % based on a total weight of the enhanced hydrocarbon recovery composition. The amount of the sodium hexyl ($C_6$) diphenyl oxide disulfonate salt can be present in the enhanced hydrocarbon recovery composition in an amount ranging from any of the minimum values described above to any of the maximum values described above.

Suitable biocide components include glutaraldehyde, alkyl dimethyl benzyl ammonium chloride, or a combination thereof.

In embodiments, the biocide component can be present in the enhanced hydrocarbon recovery composition in an amount of at least about 0.001, 0.002, 0.003, 0.004, or 0.005 wt % and less than about 5, 4, 3, 2, or 1 wt % based on a total weight of the enhanced hydrocarbon recovery composition; alternatively, in an amount of at least about 0.001, 0.002, 0.003, 0.004, or 0.005 wt % and less than about 1.0, 0.9, 0.8, 0.7, 0.6, 0.5, 0.4, 0.3, 0.2, or 0.1 wt % based on a total weight of the enhanced hydrocarbon recovery composition; alternatively, in an amount of at least about 0.001, 0.002, 0.003, 0.004, or 0.005 wt % and less than about 0.1, 0.09, 0.08, 0.07, 0.06, 0.05, 0.04, 0.03, 0.02, or 0.01 wt % based on a total weight of the enhanced hydrocarbon recovery composition; alternatively, in an amount of at least about 0.001, 0.002, 0.003, 0.004, 0.005 wt % and less than about 0.01, 0.009, 0.008, 0.007, or 0.006 wt % based on a total weight of the enhanced hydrocarbon recovery composition. In embodiments, the biocide component can be present in the enhanced hydrocarbon recovery composition in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 wt % based on a total weight of the enhanced hydrocarbon recovery composition. The amount of the biocide component can be present in the enhanced hydrocarbon recovery composition in an amount ranging from any of the minimum values described above to any of the maximum values described above.

In embodiments, glutaraldehyde can be present in an amount of at least about 50, 55, 60, 65, 70, or 75 wt % and less than about 100, 95, 90, 85, 80, or 75 wt % based on a total weight of the biocide component. The amount of glutaraldehyde can be present in the biocide component in an amount ranging from any of the minimum values described above to any of the maximum values described above.

In embodiments, alkyl dimethyl benzyl ammonium chloride can be present in an amount of at least about 0, 5, 10, 15, 20, or 25 wt % and less than about 50, 45, 40, 35, 30, or 25 wt % based on a total weight of the biocide component. The amount of alkyl dimethyl benzyl ammonium chloride can be present in the biocide component in an amount ranging from any of the minimum values described above to any of the maximum values described above.

The water component can include any type and concentration of water known in the art of hydrocarbon recovery for the purposes of enhanced recovery. The water component can include fresh water, gray water, untreated produced water, treated produced water, or a combination thereof.

Fresh water can be defined by a total dissolved solids (TDS) of less than about 2,000 ppm. TDS values disclosed herein are measured as the sum of dissolved ions measured by inductively coupled plasma (ICP). In embodiments, an amount of fresh water in the water component can be present in an amount of at least about 40, 45, 50, 55, or 60 wt % and less than about 100, 95, 90, 85, 80, 75, 70, or 65 wt % based on a total weight of the water component. The amount of fresh water can be present in the water component in an amount ranging from any of the minimum values described above to any of the maximum values described above.

Produced water (e.g., treated or untreated) can be defined by a TDS of at least about 50,000, 60,000, or 70,000 ppm and less than about 100,000, 90,000, or 80,000 ppm. In embodiments, treated produced by can be further defined by a hardness of at least about 1,000, 1,500, 2,000, 2,500, 3,000, 3,500, 4,000, 4,500, 5,000, or 5,500 ppm minerals and less than about 10,000, 9,000, 8,000, 7,000, or 6,000 ppm minerals.

In embodiments, the amount of gray water, untreated produced water, treated produced water, or a combination thereof can be present in an amount of at least about 10, 15, 20, 25, 30, 35, or 40 wt % and less than about 60, 55, 50, 45, or 40 wt % based on a total weight of the water component. The amount of gray water, untreated produced water, treated produced water, or a combination thereof can be present in the water component in an amount ranging from any of the minimum values described above to any of the maximum values described above.

In embodiments, the amount of untreated produced water, treated produced water, or a combination thereof can be present in an amount of at least about 10, 15, 20, 25, 30, 35, or 40 wt % and less than about 60, 55, 50, 45, or 40 wt % based on a total weight of the water component. The amount of untreated produced water, of treated produced water, or a combination thereof can be present in the water component in an amount ranging from any of the minimum values described above to any of the maximum values described above.

In embodiments, the water component can consist of fresh water and treated produced water. In these embodiments, the fresh water can be present in an amount of at least 50, 51, 52, 53, 54, 55, 56, 57, 58, 59, or 60 wt % and less than 70, 69, 68, 67, 66, 65, 64, 63, 62, or 61 wt % based on a total weight of the water component; and the treated produced water can be present in an amount of at least 30, 31, 32, 33, 34, 35, 36, 37, 38, 39, or 40 wt % and less than 50, 49, 48, 47, 46, 45, 44, 43, 42, or 41 wt % based on a total weight of the water component. The disclosed composition has the ability to utilize produced water, or treated produced water, and the large amounts that can be used reduce the cost of the water component over other enhanced recovery composition that require larger amounts of fresh water.

In embodiments, the water component can be present in an amount of at least about 0.00, 0.01, 0.1, 1.0, 10, 20, 30, 40, or 50 wt % to less than about 99.99, 99.9, 99.8, 99.7, 99.6, 99.5, 99.4, 99.3, 99.2, 99.1, 99, 98, 97, 96, 95, 94, 93, 92, 91, 90, 80, 70, or 60 wt % based on a total weight of the enhanced hydrocarbon recovery composition. The amount of the water component can be present in the enhanced hydrocarbon recovery composition in an amount ranging from any of the minimum values described above to any of the maximum values described above.

An alkali component can optionally be included in the enhanced hydrocarbon recovery composition. The alkali can be used to increase the pH of the composition so as to cause a reaction with crude oil in-situ that creates a natural hydrophobic soap. Suitable alkali for use in the alkali component can include sodium carbonate, sodium hydroxide, or a combination of sodium carbonate and sodium hydroxide.

In embodiments, the amount of alkali component can be present in an amount of at least about 0.01, 0.02, 0.03, 0.04, 0.05, 0.06, 0.07, 0.08, 0.09, or 0.1 wt % and less than about 1.0, 0.9, 0.8, 0.7, 0.6, or 0.5 wt % based on a total weight of the enhanced hydrocarbon recovery composition. In embodiments, the alkali component can be present in the enhanced hydrocarbon recovery composition in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 wt % based on a total weight of the enhanced hydrocarbon recovery composition. The amount of the alkali component can be present in the enhanced hydrocarbon recovery composition in an amount ranging from any of the minimum values described above to any of the maximum values described above.

A cosolvent component can optionally be included in the enhanced hydrocarbon recovery composition. Suitable cosolvents can include alcohols, such as lower carbon chain alcohols such as methanol, ethanol, isopropyl alcohol, n-propyl alcohol, n-butyl alcohol, sec-butyl alcohol, n-amyl alcohol, sec-amyl alcohol, n-hexyl alcohol, sec-hexyl alcohol, or combinations thereof; alcohol ethers, polyalkylene alcohol ethers, polyalkylene glycols, poly(oxyalkylene)glycols, poly(oxyalkylene)glycol ethers, ethoxylated phenol, or combinations thereof. In embodiments, the cosolvents for use in the cosolvent component can include methanol, ethanol, isopropyl alcohol, propylene glycol, ethylene glycol mono-butyl ether, diethylene mono-butyl ether, and triethylene mono-butyl ether, or a combination thereof.

In embodiments, the cosolvent component can be present in an amount of at least 0.01, 0.02, 0.03, 0.04, 0.05, 0.06, 0.07, 0.08, 0.09, or 0.1 wt % and less than about 5, 4.5, 4, 3.5, 3, 2.5, 2, or 1.5 wt % based on a total weight of the enhanced hydrocarbon recovery composition; alternatively, in an amount of at least about 0.01, 0.02, 0.03, 0.04, 0.05, 0.06, 0.07, 0.08, 0.09, or 0.1 wt % and less than about 1.0, 0.9, 0.8, 0.7, 0.6, 0.5, 0.4, 0.3, or 0.2 wt % based on a total weight of the enhanced hydrocarbon recovery composition. In embodiments, the cosolvent component can be present in the enhanced hydrocarbon recovery composition in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 wt % based on a total weight of the enhanced hydrocarbon recovery composition. The amount of the cosolvent component can be present in the enhanced hydrocarbon recovery composition in an amount ranging from any of the minimum values described above to any of the maximum values described above.

A hydrotrope component can optionally be included in the enhanced hydrocarbon recovery composition. Hydrotropes can be included to improve the aqueous stability of the composition. Suitable hydrotropes for use in the hydrotrope component can include sodium toluene sulfonate, potassium toluene sulfonate, sodium xylene sulfonate, ammonia xylene sulfonate, potassium xylene sulfonate, calcium xylene sulfonate, sodium cumene sulfonate, ammonia cumene sulfonate, or a combination thereof.

In embodiments, the hydrotrope component can be present in an amount of at least 0.01, 0.02, 0.03, 0.04, 0.05, 0.06, 0.07, 0.08, 0.09, or 0.1 wt % and less than about 5, 4.5, 4, 3.5, 3, 2.5, 2, or 1.5 wt % based on a total weight of the enhanced hydrocarbon recovery composition; alternatively, in an amount of at least about 0.01, 0.02, 0.03, 0.04, 0.05, 0.06, 0.07, 0.08, 0.09, or 0.1 wt % and less than about 1.0, 0.9, 0.8, 0.7, 0.6, 0.5, 0.4, 0.3, or 0.2 wt % based on a total weight of the enhanced hydrocarbon recovery composition. In embodiments, the hydrotrope component can be present in the enhanced hydrocarbon recovery composition in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 wt % based on a total weight of the enhanced hydrocarbon recovery composition. The amount of the hydrotrope component can be present in the enhanced hydrocarbon recovery composition in an amount ranging from any of the minimum values described above to any of the maximum values described above.

A viscosifying component can optionally be included in the enhanced hydrocarbon recovery composition. The viscosifying component can be included to increase or otherwise adjust the viscosity of the enhanced hydrocarbon recovery composition prior to being introduced into a wellbore.

Suitable viscosifying components for use in the viscosifying component can include polysaccharides, such as hydrolyzed polyacrylamide, xantham gum, scleroglucan, or a combination thereof.

In embodiments, the viscosifying component can be present in an amount of at least 0.01, 0.02, 0.03, 0.04, 0.05, 0.06, 0.07, 0.08, 0.09, or 0.1 wt % and less than about 5, 4.5, 4, 3.5, 3, 2.5, 2, or 1.5 wt % based on a total weight of the enhanced hydrocarbon recovery composition; alternatively, in an amount of at least about 0.01, 0.02, 0.03, 0.04, 0.05, 0.06, 0.07, 0.08, 0.09, or 0.1 wt % and less than about 1.0, 0.9, 0.8, 0.7, 0.6, 0.5, 0.4, 0.3, or 0.2 wt % based on a total weight of the enhanced hydrocarbon recovery composition. In embodiments, the viscosifying component can be present in the enhanced hydrocarbon recovery composition in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, or 5 wt % based on a total weight of the enhanced hydrocarbon recovery composition. The amount of the viscosifying component can be present in the enhanced hydrocarbon recovery composition in an amount ranging from any of the minimum values described above to any of the maximum values described above.

Optionally, the enhanced hydrocarbon recovery composition can include one or more of an acid, a polymer, a friction reducer, a gelling agent, a crosslinker, a scale inhibitor, a breaker, a pH adjusting agent, a non-emulsifier agent, an iron control agent, a corrosion inhibitor, a clay stabilizing agent, a proppant, a wettability alteration chemical, or combinations thereof.

The enhanced hydrocarbon recovery composition disclosed herein is generally in a liquid phase. The liquid phase may have dissolved solids, and the continuous phase is a liquid.

Methods

The method can generally include using an embodiment of the enhanced hydrocarbon recovery composition to stimulate a subterranean formation for enhanced hydrocarbon recovery. In some instances, the enhanced hydrocarbon recovery composition can be introduced to alter the wettability of features within the subterranean formation (e.g., fractures, fissures, pores, or combinations thereof). In embodiments, the enhanced hydrocarbon recovery disclosed herein is a remediating chemical treatment, and the downhole introduction pressure can be generally less than a fracturing pressure of the subterranean formation.

In embodiments, the method can include introducing an embodiment of the enhanced hydrocarbon recovery composition described herein into a subterranean formation via a wellbore. In embodiments, the wellbore or a portion thereof is unconventional and the subterranean formation or a portion thereof is unconventional; alternatively, the wellbore or a portion thereof is conventional and the subterranean formation or a portion thereof is conventional; alternatively, the wellbore or a portion thereof is unconventional and the subterranean formation or a portion thereof is conventional; alternatively, the wellbore or a portion thereof is conventional and the subterranean formation or a portion thereof is unconventional.

In some embodiments, introducing the enhanced hydrocarbon recovery composition into the subterranean formation via the wellbore can include introducing the enhanced hydrocarbon recovery composition through the wellbore and into the subterranean formation at a sufficient pressure and at a sufficient rate to stimulate hydrocarbon production from naturally occurring fractures, fissures, and pores or artificially created fractures in the subterranean formation. The enhanced hydrocarbon recovery composition can be introduced at a flow rate in a range of from about 1 to about 125 barrels per minute. The enhanced hydrocarbon recovery composition can be introduced at the flow rate for a period of time of at least 1, 2, 3, 4, 5, or 6 hours and less than 20, 19, 18, 17, 16, 15, 14, 13, 12, 11, or 10 days.

In embodiments, the method can include allowing the introduced enhanced hydrocarbon recovery composition to settle, absorb, disperse, imbibe, or a combination thereof in the subterranean formation in which the wellbore is formed. The composition can be allowed to settle, absorb, disperse, imbibe, or a combination thereof for a period of time depending on the nature of the subterranean formation. The composition can begin to settle, absorb, disperse, imbibe, or a combination thereof during the introducing step and continue after the introducing step has been discontinued. In embodiments, the enhanced hydrocarbon recovery composition can be allowed to settle, absorb, disperse, imbibe, or a combination thereof into the subterranean formation for at least 1, 2, 3, 4, 5, or 6 days, or at least 1, 2, 3, 4, or 5 weeks, or at least 1, 2, 3, 4, or 5 months and less than 12, 11, 10, 9, 8, 7, or 6 months. The allowing step can be performed for a period of time from any minimum value disclosed herein to any maximum value disclosed herein.

In some embodiments, during the allowing step, the flow of the composition can be discontinued. Flow at the wellhead can be shut off with a valve or other flow cutoff device, or a pressure can be applied from the surface by any technique known in the art with the aid of this disclosure such that fluids in the subterranean do not flow upward through the wellbore and out of the wellbore at the wellsite where the composition was introduced.

In embodiments, the method can include, prior to introducing the composition into the subterranean formation, preparing the enhanced hydrocarbon recovery composition. For example, the enhanced hydrocarbon recovery composition can be prepared by: forming or obtaining the surfactant component, forming or obtaining the water component, and combining the surfactant component and the water component to form the enhanced hydrocarbon recovery composition. The surfactant component can be embodied in the liquid phase, and the water component can be embodied in the liquid phase, and combining the surfactant component and the water component can include mixing the liquid surfactant component and the liquid water component to form the enhanced hydrocarbon recovery composition in the liquid phase. In embodiments, the biocide component can be added to the water component, to the surfactant component, or to both the water component and the surfactant component before combining the water component and the surfactant component to form the enhanced hydrocarbon recovery composition. The alkali component, cosolvent component, hydrotrope component, and viscosifying component can independently or in combination be added to the surfactant component, the water component, or both the surfactant component and the water component before combining the water component and the surfactant component to form the enhanced hydrocarbon recovery composition.

In embodiments, prior to introducing the composition into the subterranean formation, the method can include producing a first hydrocarbon product from the wellbore or from a second wellbore formed in the same subterranean formation. In embodiments where the same wellbore is used for composition introduction and hydrocarbon production, the method can include producing a first hydrocarbon product from the wellbore, stopping production of the first hydrocarbon product, and introducing the composition via the wellbore. In embodiments where a first wellbore is used for hydrocarbon production and a second wellbore is used for composition introduction, the method can include producing a first hydrocarbon product from the first wellbore, stopping production of the first hydrocarbon product, optionally shutting off the first wellbore, and introducing the composition via the second wellbore.

In embodiments, after introducing the composition into the subterranean formation, the method can include producing a second hydrocarbon product from the wellbore or from a second wellbore formed in the same subterranean formation. In embodiments where the same wellbore is used for composition introduction and hydrocarbon production, the method can include introducing the composition via the wellbore, discontinuing flow of the composition into the wellbore, and producing a second hydrocarbon product from the wellbore. In embodiments where a first wellbore is used for hydrocarbon production and a second wellbore is used for composition introduction, the method can include introducing the composition via the second wellbore, discontinuing flow of the composition into the second wellbore, shutting off the second wellbore, and producing a second hydrocarbon product from the first wellbore.

In embodiments, the first hydrocarbon product has a first composition that is different than a second composition of the second hydrocarbon product. In embodiments, the first hydrocarbon product and the second hydrocarbon product consist of the hydrocarbons (e.g., the hydrocarbon component) of the fluid produced from the well. The hydrocarbons in these embodiments do not include any hydrocarbons used in a stage of hydrocarbon recovery that occurred before the chemical enhanced hydrocarbon recovery using a composition and method described herein.

In embodiments, the method can include altering a hydrocarbon product composition produced from the subterranean formation after introducing the enhanced hydrocarbon recovery composition into the subterranean formation such that a first hydrocarbon product produced prior to the introducing step has a first composition that is different than a second composition of a second hydrocarbon product produced after the introducing step.

EXAMPLES

The compositions and methods will be described in greater detail by way of specific examples. The following examples are offered for illustrative purposes, and are not intended to limit the invention in any manner.

Example 1 and Example 2

Two enhanced hydrocarbon recovery compositions were tested using two core samples taken from the same subterranean formation. One core sample was used for testing the composition of Example 1, and the other core sample was used for testing the composition of Example 2. The core samples were substantially identical in rock properties and fluid properties.

The enhanced hydrocarbon recovery (EHR) compositions of Example 1 and Example 2 each contained a surfactant component and a water component. The surfactant component contained one nonionic surfactant and two anionic surfactants. The two anionic surfactants in each of Example 1 and Example 2 were sodium dodecyl ($C_{12}$ branched) diphenyl oxide disulfonate salt and sodium $C_6$ diphenyl oxide disulfonate salt. The water component was also the same for both Example 1 and Example 2. The nonionic surfactant of Example 1 was a normal mixture of $C_9$-$C_{11}$ ethoxylated alcohols, and the nonionic surfactant of Example 2 was a mixture of isomerized $C_{10}$-rich $C_9$-$C_{11}$ ethoxylated alcohols. The amount of nonionic surfactant, anionic surfactants, and water component in the two compositions was the same.

The enhanced hydrocarbon recovery (EHR) composition in Example 1 was: i) 0.2425 wt % of mixture of $C_9$-$C_{11}$ ethoxylated alcohols, ii) 0.1100 wt % of sodium dodecyl ($C_{12}$ branched) diphenyl oxide disulfonate salt, iii) 0.0945 wt % of sodium $C_6$ diphenyl oxide disulfonate salt, and iv) 99.553 wt % of a water component. The mixture of $C_9$-$C_{11}$ ethoxylated alcohols had normal distribution of $C_9$, $C_{10}$, and $C_{11}$ molecules. Thus, the mixture of $C_9$-$C_{11}$ ethoxylated alcohols in Example 1 was not considered to be C10-rich within the scope of this disclosure. Moreover, no processing was made to the mixture of $C_9$-$C_{11}$ ethoxylated alcohols such that the mixture would have been considered to be isomerized.

The EHR composition in Example 2 was: i) 0.2425 wt % of mixture of isomerized $C_{10}$-rich $C_9$-$C_{11}$ ethoxylated alcohols, ii) 0.1100 wt % of sodium dodecyl ($C_{12}$ branched) diphenyl oxide disulfonate salt, iii) 0.0945 wt % of sodium $C_6$ diphenyl oxide disulfonate salt, and iv) 99.553 wt % of a water component. The mixture of isomerized C10-rich $C_9$-$C_{11}$ ethoxylated alcohols included isomers for C ethoxylated alcohol, $C_{10}$ ethoxylated alcohol, and $C_{11}$ ethoxylated alcohol. Structural isomers were present, and it is believed that is was possible that stereoisomers could also have been present. The EHR composition of Example 2 had a distribution of EO units, with an average of 8 EO units among the molecules in the mixture. About two-thirds of the mixture of isomerized C10-rich $C_9$-$C_{11}$ ethoxylated alcohols contained molecules with 8 EO units, while the remainder of the mixture of isomerized C10-rich $C_9$-$C_{11}$ ethoxylated alcohols had more or fewer EO units that fit a normal distribution around 8 EO units. The $C_9$-$C_{11}$ tails on the ethoxylated alcohols in the EHR composition of Example 2 were substantially branched.

The water components for both Example 1 and Example 2 were identical. The water components were obtained treating a raw produced water to form a treated produced water, and then mixing the treated produced water with freshwater to obtain the water component. Properties for the raw produced water, treated produced water, and water component are shown in the table below:

TABLE 1

| Parameter | Units | Raw Produced Water | Treated Produced Water | Freshwater | Water Component |
|---|---|---|---|---|---|
| pH | SU | 6.4 | 7.1 | 8.3 | 7.2 |
| Total Dissolved Solids | mg/L | 101,430 | 99,847 | 1,378 | 29,534 |
| Total Alkalinity | mg/L | 251 | 227 | 181 | 193 |
| Chloride | mg/L | 62,300 | 62,300 | 430 | 18,100 |
| Sulfate | mg/L | 362 | 460 | 330 | 390 |
| Bicarbonate | mg/L | 251 | 277 | 181 | 193 |
| Carbonate | mg/L | 0 | 0 | 0 | 0 |
| Hydroxide | mg/L | 0 | 0 | 0 | 0 |
| Phosphate | mg/L | 0 | 2.1 | 0 | 0 |
| Borate | mg/L | 100 | 110 | 2.9 | 0.7 |
| Silica | mg/L | 28 | 0 | 54.5 | 0 |
| Sodium | mg/L | 32,500 | 32,500 | 179 | 9,571 |
| Potassium | mg/L | 206 | 346 | 15.2 | 140 |
| Magnesium | mg/L | 506 | 407 | 77.6 | 144 |
| Calcium | mg/L | 3,710 | 3,600 | 117 | 675 |
| Strontium | mg/L | 832 | 710 | 3.8 | 121 |
| Barium | mg/L | 3.06 | 1.2 | 0 | 0.5 |
| Iron | mg/L | 8.13 | 0.6 | 0 | 0 |
| Manganese | mg/L | 0.284 | 0.3 | 0 | 0.3 |
| Lead | mg/L | 0 | 0 | 0 | 0 |
| Zinc | mg/L | 0 | 0 | 0 | 0.1 |
| Lithium | mg/L | 24.4 | 22.1 | 0.2 | 5.1 |
| Aluminum | mg/L | 0 | 0 | 0.1 | 0.5 |

Each composition in Example 1 and Example 2 was tested in the apparatus 100 illustrated in the FIGURE. The FIGURE illustrates the apparatus 100 having a portion cut away so that the core sample 101 is visible in the FIGURE. The apparatus 100 was a custom fabricated pressurize-able core holder. The apparatus 100 was a cylindrical vessel formed of stainless steel, having a removable lid. The inlet 102 for the EHR compositions and the outlet 103 for the produced oil product were on the lid. A port 104 for measuring pressure was located on the bottom of the cylindrical vessel.

For each of Example 1 and Example 2, the lid of the apparatus 100 was removed, and a core sample 101 was placed in the apparatus 100. Each core sample was a solid cylindrical specimen, having a diameter of 3.81 cm and a height of 6.00 cm. Moreover, each core sample had been previously measured for original oil in place (OOIP) in the sample, so as to determine the amount of oil recovered using each EHR composition. The same OOIP measurement method was used for measuring OOIP in Example 1 and Example 2.

After placing the core sample in the apparatus 100, the apparatus 100 was then sealed from the atmosphere by securing the lid to the cylindrical body. The inlet 102 was then fluidly connected to an accumulator containing the respective EHR composition. A valve was coupled between the inlet 102 and the accumulator. The outlet 103 was fluidly connected to a pressure regulator valve, which was fluidly coupled to a graduated cylinder for sample collection.

Each EHR composition was introduced into the apparatus 100 via the inlet line 102. The apparatus 100 having the core sample and the introduced EHR composition therein was then pressurized to 4,500 psig via the inlet 102 in order to produce a forced imbibition upon the core sample 101. Pressure across the core sample 101 was allowed to equilibrate as indicated by first core end pressure measured via a pressure gauge on the inlet 102 equaling a second core end pressure measured via a pressure gauge on the port 104.

Sampling was accomplished by reducing the vessel pressure incrementally by opening the pressure regulator valve coupled to the outlet 103. Effluent that flowed from the vessel via the outlet 103 while reducing pressure was collected in the graduated cylinder as the sample for that day.

For Example 1, a sample of the contents of the apparatus 100 was taken via outlet line 103 on day 0 (the day of EHR composition introduction), day 2, day 5, and day 7. Thus, pressure was reduced incrementally for Example 1 on day 0, day 2, day 5, and day 7 to collect samples on those days.

For Example 2, a sample of the contents of the apparatus 100 was taken via outlet line 103 on day 0 (the day of EHR composition introduction), day 2, day 3, day 4, day 5, day 6, and day 7. Thus, pressure was reduced incrementally for Example 2 on day 0, day 1, day 2, day 3, day 4, day 5, day 6, and day 7 to collect samples on those days.

Process variables were substantially the same between Example 1 and Example 2 (e.g., EHR composition flow rate, amount of EHR composition introduced, pressure, temperature).

Each sample was analyzed for the amount of oil present to determine the cumulative percentage of oil recovered from the original oil in place (OOIP) in the affected core volume of each core sample. The affected core volume was substantially identical for the core samples in each of Example 1 and Example 2. The following table reports the values for % OOIP of affected core volume for each of Example 1 and Example 2:

TABLE 2

| Time (day) | Example 1 (% OOIP of affected core volume) | Example 2 (% OOIP of affected core volume) |
|---|---|---|
| 0 | 0* | 0 |
| 1 | 0 | 7 |
| 2 | 2 | 15 |
| 3 | 2 | 22 |
| 4 | 3 | 30 |
| 5 | 4 | 37 |
| 6 | 5 | 45 |
| 7 | 6 | 52 |

*Each core sample did contain some flush oil that was recovered on day 0 and measurable for purposes of determining composition of oil recovered on day 0; however, the amount was so small that percentage is negligible (zero) relative to the total recovery, and is reported as 0% in Table 2.

The EHR composition of Example 1 only recovered 6% of OOIP of the affected core volume after 7 days; whereas, the EHR composition of Example 2 recovered 52% OOIP of the affected core volume. The oil recovery of Example 2 was significantly higher than the oil recovery of Example 1, which was surprising and unexpected. The mixture of isomerized C10-rich $C_9$-$C_{11}$ ethoxylated alcohols in Example 2 outperformed the non-isomerized and non-C10-rich mixture of $C_9$-$C_{11}$ ethoxylated alcohols in Example 1 by almost 9 times.

The difference in oil recovery between Example 1 and Example 2 suggests that the isomerization of the mixture of $C_9$-$C_{11}$ ethoxylated alcohols, the C10-rich composition of the mixture of $C_9$-$C_{11}$ ethoxylated alcohols, or both, can significantly contribute to enhancing hydrocarbon recovery in a subterranean formation, since the normal mixture of $C_9$-$C_{11}$ ethoxylated alcohols had significantly lower amounts of hydrocarbon recovery.

Biomarkers of oil composition were also investigated for the EHR compositions of Example 1 and Example 2. The biomarkers used were n-$C_{17}$, n-$C_{18}$, pristane, and phytane. Concentration of n-$C_{17}$, n-$C_{18}$, pristane, and phytane were measured in each sample by gas chromatography or mass spectrometry. The ratio of concentration of n-$C_{17}$ to pristane and the ratio of the concentration of n-Cis to phytane were used to indicate the composition of the crude oil recovered from the core samples using the EHR compositions.

The following table presents the n-$C_{17}$ to pristane ratio and the n-Cis to phytane ratio for samples taken for each of Example 1 and Example 2.

TABLE 3

| Time (day) | Example 1 (ratio of [n-$C_{17}$]/ [pristane]) | Example 1 (ratio of [n-$C_{18}$[/ [phytane]) |
|---|---|---|
| 0 | 1.326 | 1.675 |
| 1 | — | — |
| 2 | 1.325 | 1.662 |
| 3 | — | — |
| 4 | — | — |
| 5 | 1.331 | 1.692 |
| 6 | — | — |
| 7 | 1.333 | 1.651 |

TABLE 4

| Time (day) | Example 2 (ratio of [n-$C_{17}$]/ [pristane]) | Example 2 (ratio of [n-$C_{18}$[/ [phytane]) |
|---|---|---|
| 0 | 1.360 | 1.708 |
| 1 | 1.343 | 1.655 |
| 2 | 1.345 | 1.669 |
| 3 | 1.323 | 1.587 |
| 4 | 1.317 | 1.525 |
| 5 | 1.300 | 1.490 |
| 6 | 1.294 | 1.508 |
| 7 | 1.310 | 1.524 |

For Example 1, it can be seen that the n-$C_{17}$ to pristane ratio changed from an initial value of 1.326 to a value of 1.333 after 7 days, which is a change of about 0.5%. The n-$C_{18}$ to phytane ratio changed from an initial value of 1.675 to 1.651 after 7 days, which is a change of about 1.4%. These changes are considered nominal and not indicative of a change in oil composition before and after EHR composition introduction in Example 1. These changes are within expectation, e.g., within typical experimental uncertainty.

For Example 2, it can be seen that the n-$C_{17}$ to pristane ratio changed from an initial value of 1.360 to a value of 1.310 after 7 days, which is a change of about 4.8%. The n-$C_{18}$ to phytane ratio changed from an initial value of 1.708 to 1.524, which is a change of about 11.7%. These changes are significantly higher than Example 1, and are surprising and unexpected. It is believed that changes in these two ratios are indicative that a different oil composition was recovered on day 7 than was recovered on day 0 for Example 2.

Based on these results, it is believed that a mixture of isomerized C10-rich $C_9$-$C_{11}$ ethoxylated alcohols can be used, not only for enhanced hydrocarbon recovery, but to alter the composition of the hydrocarbons produced from a subterranean formation.

Prophetic Example 1

Prophetic Example 1 uses the enhanced hydrocarbon recovery (EHR) composition of Example 2 for enhancing oil recovery from a wellbore formed in a subterranean formation. Oil will have been previously produced from the wellbore, and the hydrocarbon composition of the oil produced will have been measured.

Production of oil will be stopped, and the EHR composition of Example 2 will be introduced into the subterranean formation via the wellbore at a flow rate and for a period of time within the ranges disclosed herein. The wellbore will then be isolated at the surface, and the introduced EHR composition of Example 2 will be allowed to settle, absorb, disperse, imbibe, or combinations thereof into the subterranean formation for a period of time disclosed herein.

After isolation, production from the wellbore will be resumed, and the hydrocarbon composition of the oil produced after resuming production will be measured and compared with the hydrocarbon composition of the oil produced prior to the introduction. It will be found that the hydrocarbon compositions are different.

It will also be observed that oil production after introduction will be higher than the production predicted by a decline curve for the wellbore that was calculated prior to introduction.

Prophetic Example 2

Prophetic Example 2 uses water injection into another wellbore formed in the same subterranean formation as Prophetic Example 1. Oil will have been previously produced from the wellbore, and the hydrocarbon composition of the oil produced will have been measured.

Production of oil will be stopped, and the water (e.g., brine, or only the water component of the composition of Example 2) will be introduced into the subterranean formation via the wellbore at a flow rate and for a period of time that is the same as that used for Prophetic Example 1. The wellbore will then be isolated at the surface.

After the same amount of shut-in time as Prophetic Example 1, production from the wellbore will be resumed, and the hydrocarbon composition of the oil produced after resuming production will be measured and compared with the hydrocarbon composition of the oil produced prior to the introduction. It will be found that the hydrocarbon compositions are the same or only nominally different (e.g., as indicated by the ratio of concentration of n-$C_{17}$ to pristane and the ratio of the concentration of n-$C_{18}$ to phytane, with any change within the expected uncertainty). It will also be observed that oil production after introduction will be initially higher than the production predicted by a decline curve for the wellbore that was calculated prior to introduction; however, production will decline and follow the decline curve.

It will be observed that resumed oil production for Prophetic Example 1 is clearly above the decline curve and has values that are significantly higher than the resumed oil production for Prophetic Example 2.

Prophetic Example 3

Prophetic Example 3 uses introduction of the EHR composition of Example 1 into a third wellbore formed in the same subterranean formation as Prophetic Example 1 and Prophetic Example 2. Oil will have been previously produced from the wellbore, and the hydrocarbon composition of the oil produced will have been measured.

Production of oil will be stopped, and the EHR composition of Example 1 will be introduced into the subterranean formation via the wellbore at a flow rate and for a period of time that is the same as that used for Prophetic Example 1 and Prophetic Example 2. The wellbore will then be isolated at the surface, and the introduced EHR composition of Example 1 will be allowed to settle, absorb, disperse, imbibe, or combinations thereof into the subterranean formation.

After the same amount of shut-in time as Prophetic Example 1 and Prophetic Example 2, production from the wellbore will be resumed, and the hydrocarbon composition of the oil produced after resuming production will be measured and compared with the hydrocarbon composition of the oil produced prior to the introduction. It will be found that the hydrocarbon compositions are nominally the same (e.g., as indicated by the ratio of concentration of n-$C_{17}$ to pristane and the ratio of the concentration of n-$C_{18}$ to phytane, with any change within the expected uncertainty).

It will also be observed that oil production after introduction will be initially higher than the production predicted by a decline curve for the wellbore that was calculated prior to introduction; however, the resumed oil production in Prophetic Example 3 will not be as high as the resumed oil production in Prophetic Example 1. Over the same amount of time after resumed production (not necessarily the same calendar time), it will be seen that oil production for Prophetic Example 3 is nominally above the decline curve and has values more comparable to the oil production due to only water introduction in Prophetic Example 2 rather than due to introduction of the EHR composition of Example 2 in Prophetic Example 1.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of the claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal language of the claims, etc. All citations referred to herein are expressly incorporated by reference.

What is claimed is:

1. An enhanced hydrocarbon recovery composition comprising:
    a surfactant component comprising a mixture of isomerized $C_{9-11}$ ethoxylated alcohols;
    wherein the mixture of isomerized $C_{9-11}$ ethoxylated alcohols comprises a $C_9$ ethoxylated alcohol, a $C_{10}$ ethoxylated alcohol, a $C_{11}$ ethoxylated alcohol, isomers of the $C_9$ ethoxylated alcohol, isomers of the $C_{10}$ ethoxylated alcohol, and isomers of the $C_{11}$ ethoxylated alcohol, and
    wherein an amount of the $C_{10}$ ethoxylated alcohol and the isomers of the $C_{10}$ ethoxylated alcohol in the mixture of isomerized $C_{9-11}$ ethoxylated alcohols is greater than about 50 wt % based on a total weight of the mixture of isomerized $C_{9-11}$ ethoxylated alcohols.

2. The enhanced hydrocarbon recovery composition of claim 1, wherein an amount of the $C_{11}$ ethoxylated alcohol and the isomers of the $C_{11}$ ethoxylated alcohol in the mixture of isomerized $C_{9-11}$ ethoxylated alcohols is in a range of from about 1 wt % to about 25 wt % based on a total weight of the mixture of isomerized $C_{9-11}$ ethoxylated alcohols.

3. The enhanced hydrocarbon recovery composition of claim 2, wherein an amount of the $C_9$ ethoxylated alcohol and the isomers of the $C_9$ ethoxylated alcohol in the mixture of isomerized $C_{9-11}$ ethoxylated alcohols is in a range of from about 1 wt % to about 25 wt % based on a total weight of the mixture of isomerized $C_{9-11}$ ethoxylated alcohols.

4. The enhanced hydrocarbon recovery composition of claim 1, wherein the surfactant component further comprises one or more anionic disulfonate surfactants.

5. The enhanced hydrocarbon recovery composition of claim 4, wherein the one or more anionic disulfonate surfactants comprise a sodium dodecyl ($C_{12}$) diphenyl oxide disulfonate salt and a sodium hexyl ($C_6$) diphenyl oxide disulfonate salt.

6. The enhanced hydrocarbon recovery composition of claim 5, wherein the dodecyl ($C_{12}$) group in the sodium dodecyl ($C_{12}$) diphenyl oxide disulfonate salt is branched.

7. The enhanced hydrocarbon recovery composition of claim 5, wherein the sodium dodecyl ($C_{12}$) diphenyl oxide disulfonate salt and the sodium hexyl ($C_6$) diphenyl oxide disulfonate salt are present in a range of from about 40 wt % to about 50 wt % of the surfactant component.

8. The enhanced hydrocarbon recovery composition of claim 1, wherein the mixture of isomerized $C_{9-11}$ ethoxylated alcohols is present in a range of from about 50 wt % to about 100 wt % of the surfactant component, wherein the mixture of isomerized $C_{9-11}$ ethoxylated alcohols has an average distribution of 8 EO units.

9. The enhanced hydrocarbon recovery composition of claim 1, wherein the surfactant component is present in a range of from about 0.01 wt % to about 5 wt % based on a total weight of the enhanced hydrocarbon recovery composition.

10. The enhanced hydrocarbon recovery composition of claim 1, further comprising a water component.

11. The enhanced hydrocarbon recovery composition of claim 10, wherein the water component comprises fresh water, gray water, untreated produced water, treated produced water, or a combination thereof.

12. The enhanced hydrocarbon recovery composition of claim 10, wherein the water component is present in a range of from about 0.01 wt % to about 99.9 wt % based on a total weight of the enhanced hydrocarbon recovery composition.

13. The enhanced hydrocarbon recovery composition of claim 1, further comprising:
    a biocide component comprising glutaraldehyde, alkyl dimethyl benzyl ammonium chloride, or a combination thereof;
    wherein the biocide component is present in a range of from about 0.001 wt % to about 1 wt % based on a total weight of the enhanced hydrocarbon recovery composition.

14. The enhanced hydrocarbon recovery composition of claim 1, further comprising:
    an alkali component comprising sodium carbonate, sodium hydroxide, or a combination thereof;

wherein the alkali component is present in a range of from about 0.01 wt % to about 1.0 wt % based on a total weight of the enhanced hydrocarbon recovery composition.

15. The enhanced hydrocarbon recovery composition of claim 1, further comprising:
   a cosolvent component comprising methanol, ethanol, isopropyl alcohol, propylene glycol, ethylene glycol mono-butyl ether, diethylene mono-butyl ether, and tri-ethylene mono-butyl ether, or a combination thereof;
   wherein the cosolvent component is present in a range of from about 0.01 wt % to about 5.0 wt % based on a total weight of the enhanced hydrocarbon recovery composition.

16. The enhanced hydrocarbon recovery composition of claim 1, wherein the enhanced hydrocarbon recovery composition further comprises:
   a hydrotrope component comprising sodium toluene sulfonate, potassium toluene sulfonate, sodium xylene sulfonate, ammonia xylene sulfonate, potassium xylene sulfonate, calcium xylene sulfonate, sodium cumene sulfonate, ammonia cumene sulfonate, or a combination thereof;
   wherein the hydrotrope component is present in a range of from about 0.01 wt % to about 5 wt % based on a total weight of the enhanced hydrocarbon recovery composition.

17. The enhanced hydrocarbon recovery composition of claim 1, further comprising:
   a viscosifying component comprising hydrolyzed polyacrylamide, xantham gum, scleroglucan, or a combination thereof;
   wherein the viscosifying component is present in a range of from about 0.01 wt % to about 5 wt % based on a total weight of the enhanced hydrocarbon recovery composition.

* * * * *